(12) United States Patent
Fujitani et al.

(10) Patent No.: US 6,331,746 B1
(45) Date of Patent: Dec. 18, 2001

(54) ACTUATOR

(75) Inventors: Sakae Fujitani; Yuzuru Suzuki; Masaki Kagawa, all of Shizuoka-ken (JP)

(73) Assignee: Minebea Co., Ltd., Nagano-Ken (JP)

( * ) Notice: Subject to any disclaimer, the term of this patent is extended or adjusted under 35 U.S.C. 154(b) by 0 days.

(21) Appl. No.: 09/490,506

(22) Filed: Jan. 25, 2000

(30) Foreign Application Priority Data

Jan. 29, 1999 (JP) .................................................. 11-022268

(51) Int. Cl.⁷ ....................................................... H02K 1/22
(52) U.S. Cl. ........................ 310/263; 310/156.01; 310/12; 310/14; 310/34
(58) Field of Search .................................. 310/263, 261, 310/264, 156, 49 R, 12, 14, 34

(56) References Cited

U.S. PATENT DOCUMENTS

| | | |
|---|---|---|
| 3,454,801 | 7/1969 | Suzuki et al. . |
| 4,333,026 * | 6/1982 | Bock et al. ............................ 310/42 |
| 5,126,605 * | 6/1992 | Palmero ................................ 310/36 |
| 5,691,583 * | 11/1997 | Suzuki et al. ...................... 310/49 R |
| 5,986,379 * | 11/1999 | Hollenbeck et al. ................ 310/257 |
| 5,996,554 | 12/1999 | Tojo et al. . |
| 6,046,519 * | 4/2000 | Hanazumi et al. ................. 310/49 R |

FOREIGN PATENT DOCUMENTS

| | | |
|---|---|---|
| JP/08340652 | 12/1996 | (EP) . |
| 00 10 1462 | 7/2000 | (EP) . |
| WO97/18616 | 11/1996 | (WO) . |

* cited by examiner

*Primary Examiner*—Nestor Ramirez
*Assistant Examiner*—Thanh Lam

(57) ABSTRACT

The present invention provides, in a single phase-structure actuator, a rotor magnet structure having characteristics wherein detent torque is fully assured, and there is also a large rotation angle range. In a single phase-structure claw pole-type actuator 10, which constitutes an armature 9 constituted from stator yokes 2, 4, which constitute a pair of donut-shaped flat yokes 23 comprising a Soft-Magnetic material, and pole tooth 25, which protrude in the axial direction from the inner rim of these flat yokes, and extend in the circumferential direction, and a cylindrical ring 31, which extends in the same direction as the pole tooth 25 on the outer rim of a yoke, and from a coil 28, which is formed by winding an insulating wire, and which is provided in a toroidal concave coil holder portion, which is formed from the flat yokes, pole tooth, and cylindrical ring of the stator yoke, and, in a stator assembly, having bearings 5, 5 equipped flanges 6, 7 at both end faces of this stator, causes a rotor 1, which is equipped with a field magnet comprising a permanent magnet rotor (hereinafter referred to as "rotor magnet" to face the pole tooth of this stator by way of a minute gap, the rotor magnet 1 is a cylindrical shape, and a plurality of magnets are connected in the axial direction, and the magnetic poles of each magnet are mutually shifted in the circumferential direction.

12 Claims, 9 Drawing Sheets

ACTUATOR

BACKGROUND OP THE INVENTION

1. Field of the Invention

The present invention relates to the structure of a single-phase-structure actuator, and more particularly to a rotor structure of an actuator, which is easy to assemble, has well-balanced holding torque and detent torque, and is stable repetitive rotation operation.

2. Description of the Related Art

The inventors of the present application have already proposed actuator technology for an actuator of a single-phase structure claw pole-type structure, according to which a stopper mechanism is provided internally, and a rotor is made to perform repetitive rotation operations by energizing a coil in this kind of actuator, it is desirable to enlarge the rotation angle range while ensuring detent torque.

However, generally speaking, increasing detent torque causes a narrowing of the rotation angle range and therefore the detent torque must be reduced to increase the rotation angle range. That is, detent torque and rotation angle range are reciprocal in nature. This tendency is particularly notable when a sintered high-performance rare earth magnet (for example, an Nd magnet or Sm magnet), having magnetic anisotropy (for example, polar anisotropy), is used to make an actuator smaller.

Figure 5:
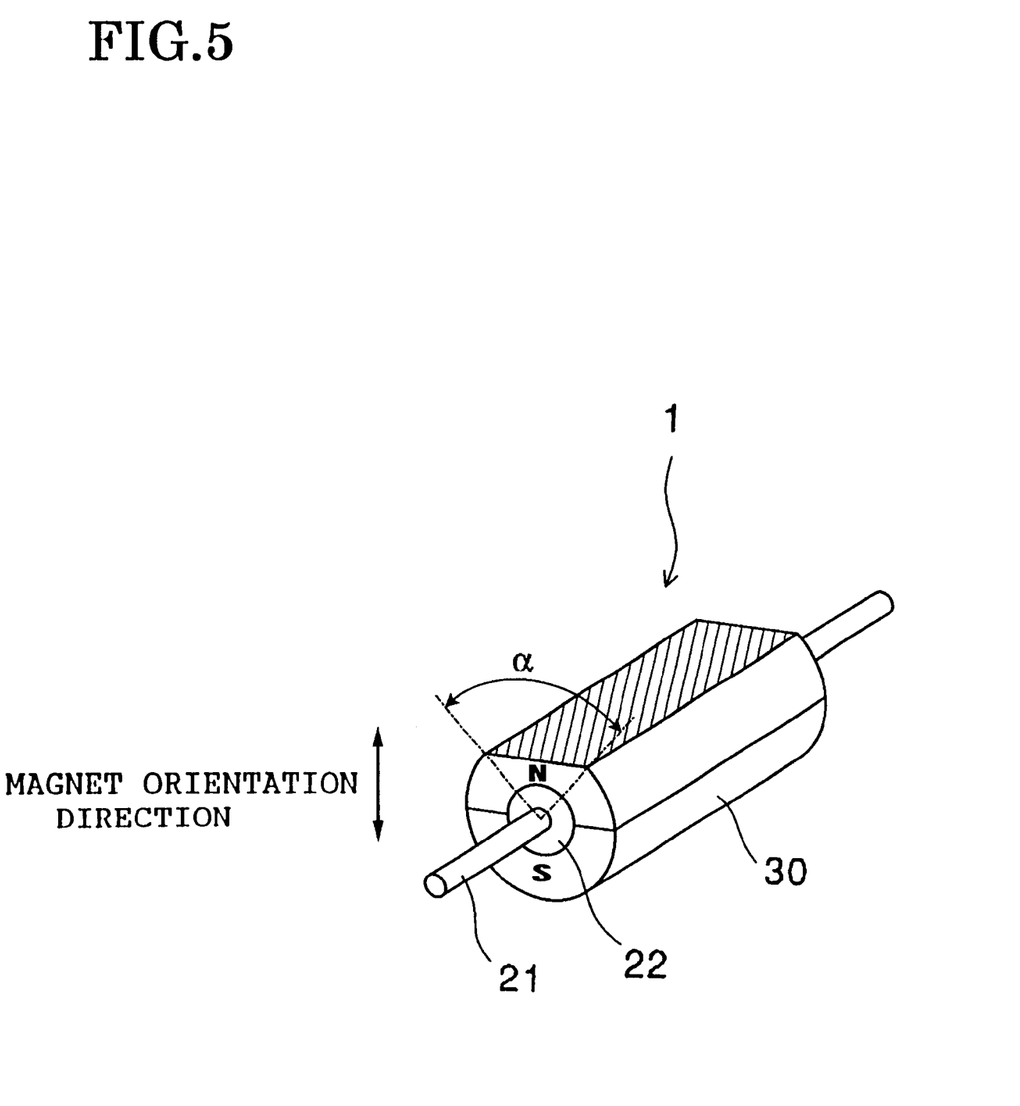
FIG. 5 shows an example of a conventional rotor magnet, the pole portion of which has been cut in the axial direction.

As a technique applied to rotor magnet for ensuring detent torque and increasing rotation angle range, there is a method by which, when the rotor magnet is go two poles for example, a groove or cut is formed axially in the polar center portion of one of a pair of poles (for example N pole only) to increase the rotation angle range by losing the magnetic balance between the N pole and the S pole (Refer to FIG. 5). However, the drawback is that numerous processes are required to ensure the precision of the shape of the groove or cut portion (specifically, the central angle α of the groove or cut), making processing complicated. The reason for this is because, in the case of a sintered magnet, the circumference of the magnet is polished after sintering. If there is a groove or cut in the magnet circumference, not only is it impossible to ensure cylindricity, but it is also very difficult to maintain a stable groove or cut shape. Another drawback is that machine processing of the groove or cut raises increase in costs.

Therefore, in consideration of magnet processing, precision maintenance, and costs, it is desirable that the shape of the circumference of a magnet is a cylindrical shape without any groove or cut.

SUMMARY OF THE INVENTION

In view of the foregoing problems, it is an object of he present invention to provide a rotor magnet structure in single phase-structure actuator having characteristics herein detent torque is fully assured, and a large rotation angle range is also provided.

To solve the above-mentioned problems, the present invention is directed to a single phase-structure actuator, wherein a rotor magnet is rotatably disposed by way of a minute gap inside an armature with a coil winding around the armature yoke characterized in that the above-mentioned rotor magnet is constituted by a plurality of magnets connected in the axial direction, and magnetic poles of magnets are mutually shifted in the circumferential direction.

Further, in another aspect of the present invention, there is proposed a single phase-structure claw pole-type actuator comprising a stator assembly comprising an armature composed of (a) a stator yoke composed of a pair of donut-shaped flat yokes made of a soft-magnetic material, a pole tooth which protrudes in the axial direction from the inner rim of this flat yoke and extends in the circumferential direction, and a cylindrical ring which extends in the same direction as said pole tooth on the outer rim of said yoke, and (b) a coil formed of a winding of an insulating wire which is disposed within an annular concave coil holder portion, which is formed by said flat yokes, pole teeth, and cylindrical ring of said stator yoke, and (c) flanges with bearings on both end faces of said armature, and a rotor equipped with a field magnet consisting of a permanent magnet rotor (hereinafter referred to as "rotor magnet") disposed to face said pole teeth of said stator yoke by way of a minute gap, characterized in that said rotor magnet is constituted by connecting a plurality of magnets in the axial direction, and the magnetic poles of each magnet are mutually shifted in the circumferential direction.

Further, the actuator is characterized in that the outside diameter of the rotor magnet is less than 3 mm, and all outside diameter dimensions are equal.

Further, the actuator is characterized in that the length of each magnet in the axial direction is equal.

Further, the actuator is characterized in that each magnet has magnetic anisotropy, and the rotor magnet is constituted from two magnets.

Further, the actuator is characterized in that the amount of shift in the clrcumferential direction of each magnet counterpart ranges within an electrical angle of 10–60 (degrees).

Further, the actuator is characterized in that a spacer having a diameter equal to or smaller than the outermost diameter of a rotor magnet is provided on the connecting portion of the magnet.

Further, the actuator is characterized in that one or more pairs of protrusions and depressions for circumferential positioning of the magnet are provided on an opposing surface of each magnet and the spacer.

Further, the actuator is characterized in that a positioning groove or hole for circumferential positioning of the rotor magnet is provided on the end face of the magnet.

Further, the actuator having a plurality of magnets are bonded and affixed by way of a spacer, is characterized in that an adhesive recess is provided in the vicinity of the center hole of the rotor magnet, or on the spacer, or on both thereof.

DESCRIPTION OF THE PREFERRED EMBODIMENTS

The present invention will now be explained hereinbelow by reference to accompanying drawings.

Figure 1:
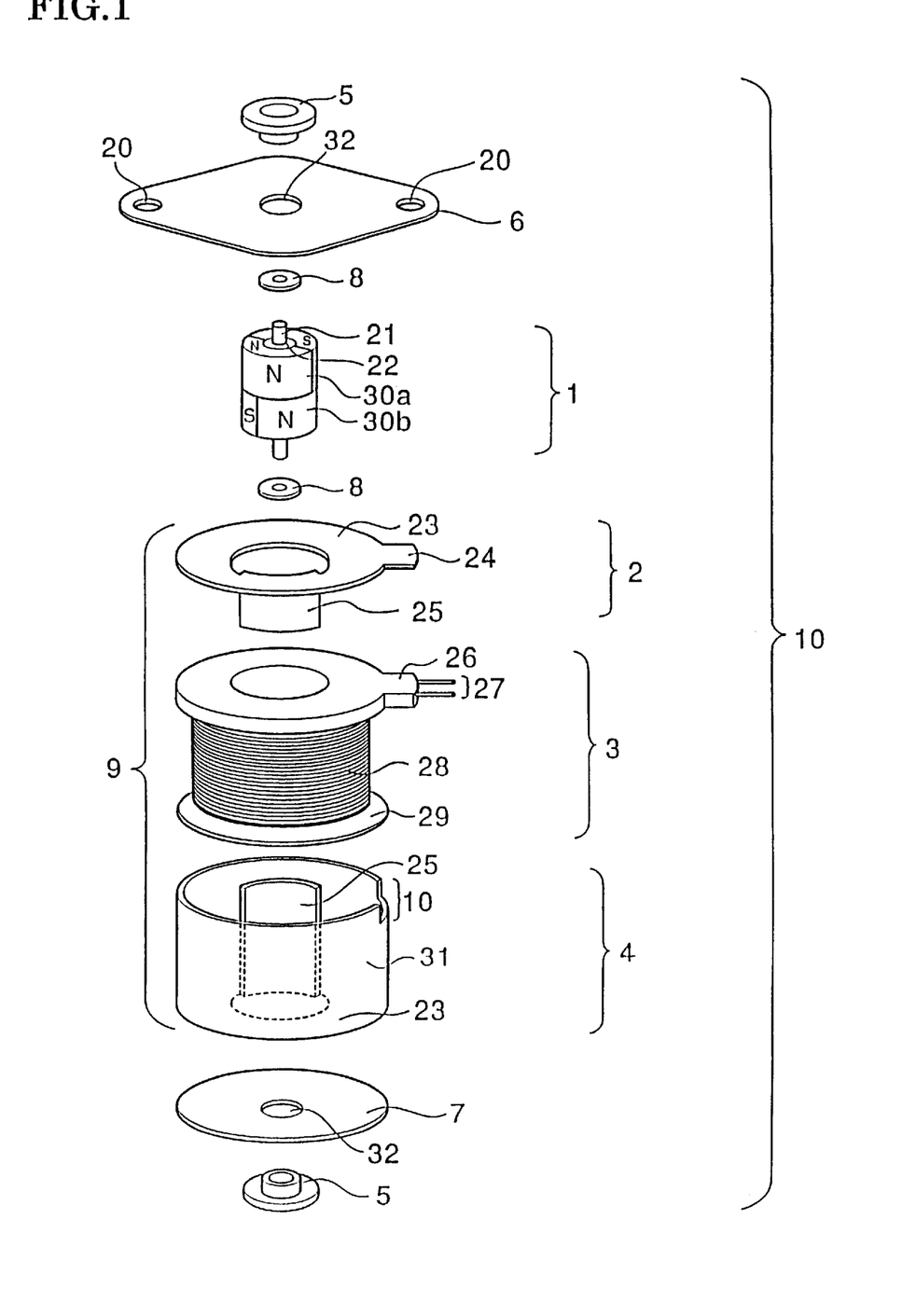
FIG. 1 is an exploded perspective view of a single-phase, claw pole-structure actuator to which the present invention is applied.

A first embodiment of the present invention will be explained by reference to FIG. 1. FIG. 1 is an exploded perspective view of a single-phase, claw pole-structure actuator to which the present invention is applied. In the embodiments, a rotor magnet is bipolar and two magnets are connected in the axial direction. In the actuator shown, a stator yoke is constituted by a first stator yoke 2, comprising a flat yoke portion 23 and a pole tooth portion 25, and a second stator yoke 4, comprising a flat yoke portion 23, a pole tooth portion 25, and a cylindrical ring portion 31.

In more detail, the actuator 10 is constituted by four elements that is a rotor 1, an armature 9, upper and lower flanges 6, 7, and bearings 5. Furthermore, the armature 9 consists of three elements that is a first stator yoke 2, a coil assembly 3, and a second stator yoke 4.

The rotor 1 comprises two magnets 30a and 30b, each polarized into two poles in its circumferential direction, which are directly connected with each other in the axial direction in such a manner that the poleg are shifted in the circumferential direction, and are affixed concentrically to a shaft 21 by way of a sleeve 22. In this embodiment, the magnets 30a, 30b, the sleeve 22, and the shaft 21 are affixed with adhesives.

The armature 9 is constituted of a first stator yoke 2, a coil assembly 3, and a second stator yoke 4, and the first stator yoke 2 is constituted by integrating a practically donut-shaped flat yoke 23 with a pole tooth 25, which, in this embodiment, protrudes in the axial direction, and extends circumferentially from the inner rim of this yoke 23. In the embodiment, the pole tooth 25 of the first stator yoke 2 is formed, specifically, by press working, that is to say, by blanking with drawing punch, in the shape of tooth, the central portion of a disk made of softmagnetic steel, sheet and bending the tooth portion in the axial direction. Furthermore, the flat yoke 23 is provided with a positioning lug 24 for determining the physical position of the flat yoke 23 with respect to the second stator yoke 4 in the circumferential direction.

The coil assembly 3 is an assembly with a coil 28 wound around a region bobbin 29 (the resin material is, for example, a liquid crystal polymer), and in this embodiment, a terminal board 26 with a terminal 27 is integrally resin-formed in the collar portion of the bobbin 29. Furthermore, this terminal board 26 has such a shape as to fit into a notch 10 provided in the upper rim of the ring 31 of the second stator yoke 4.

The second stator yoke 4 is the same as the first stator yoke 2 in that It is also integrally constituted of a practically donut-shaped flat yoke 23 and a pole tooth 25, which protrudes in the axial direction, and extends circumferentially from the inner rim of this yoke 23, but the second stator yoke 4 differs in that a ring 31 is integrally added to the outer rim of the flat yoke 23 in accordance with deep drawing in parallel to the pole tooth 25 in the axial direction. Furthermore, as explained hereinabove, the second stator yoke 4, a positioning notch 10 is provided in the ring 31, so that the pole tooth 25 of the first stator yoke 2 and the pole tooth 25 of the second stator yoke 4 can align circumferentially so as to make a phase difference in an electrical angle of 180 degrees, and the terminal board 26 of the coil assembly 3 can be housed in the notch.

The rotor 1 is inserted inside the armature 9 and bearings 5 are mounted respectively into the center hole 32 of the upper and lower flanges 6, 7 so that the rotor 1 in supported rotatably by the bearings 5. A washer 8 is used for axial aligning, and adjusting the axial play of the magnets 30a, 30b of the rotor 1 and the pole tooth 25.

In the embodiment, the bearings 5 are affixed to the upper and lower flanges 6, 7, and the upper and lower flanges 6, 7 are affixed to the first and second stator yokes 2, 4 with adhesives, but mechanical caulking, welding, a resin integral molding, and do forth may be used.

Next, the operating principle of a single-phase claw pole-structure actuator, and the torgue characteristics thereof will be explained.

Figure 2A:
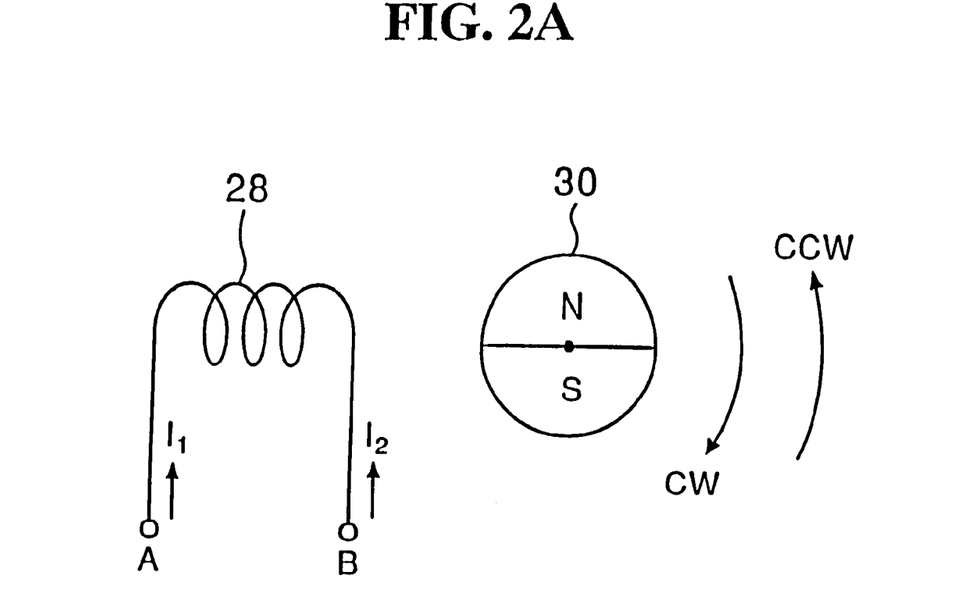
FIG. 2A is a schematic diagram for explanation of the aerating principle of a single-phase, claw pole-structure actuator in connection with a bipolar drive with a unifilar winding.
Figure 2B:
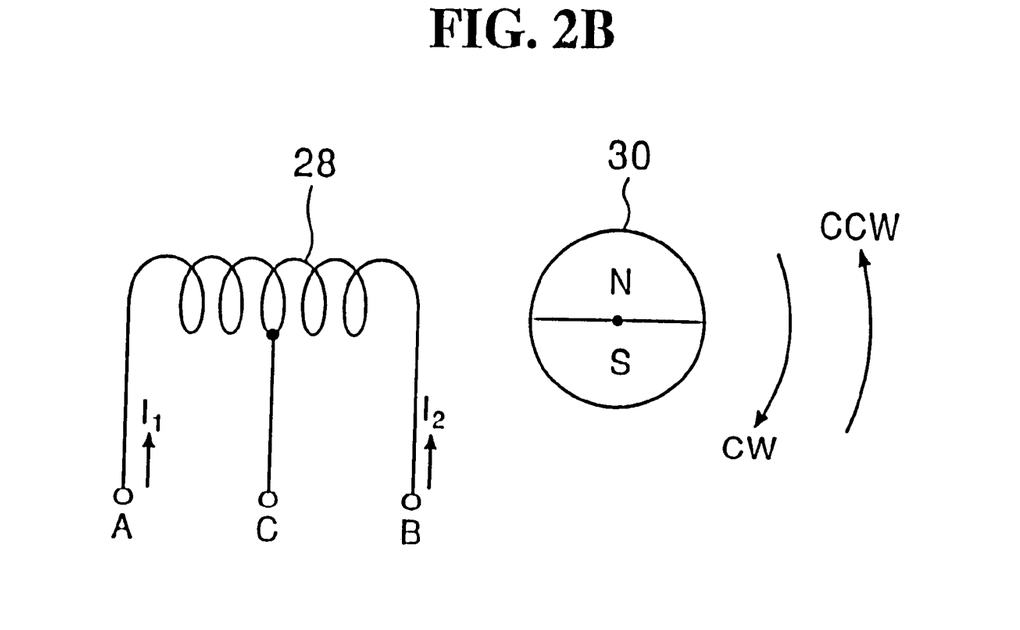
FIG. 2B is a schematic diagram for explanation of the operation principle of the same structure in connection with a unipolar drive with a bifilar winding.
Figure 3:
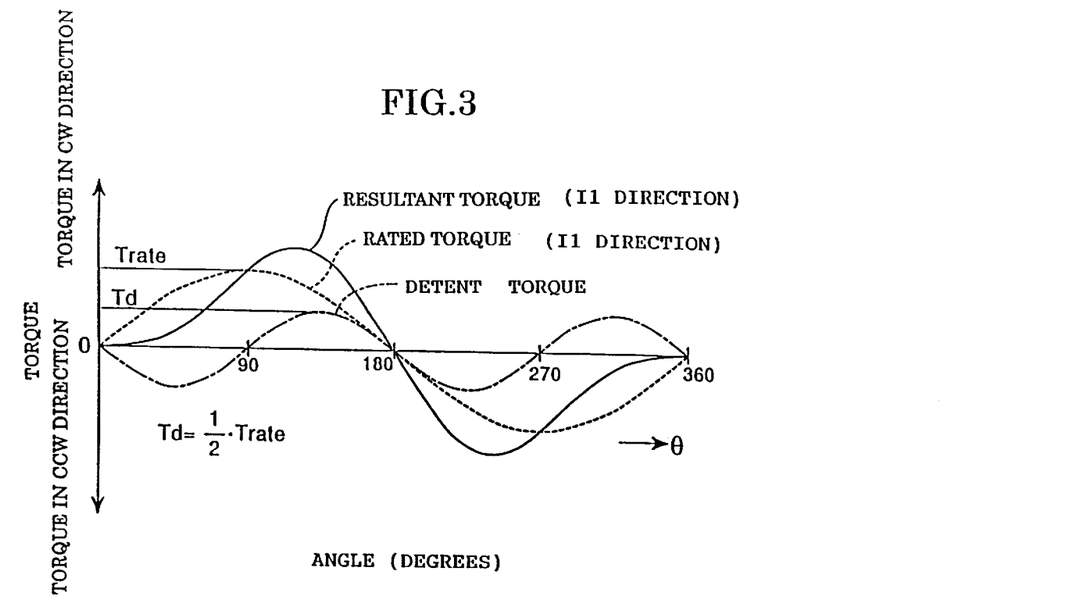
FIG. 3 shows torque characteristics of a single-phase, claw pole-structure actuator of the present invention.
Figure 4:
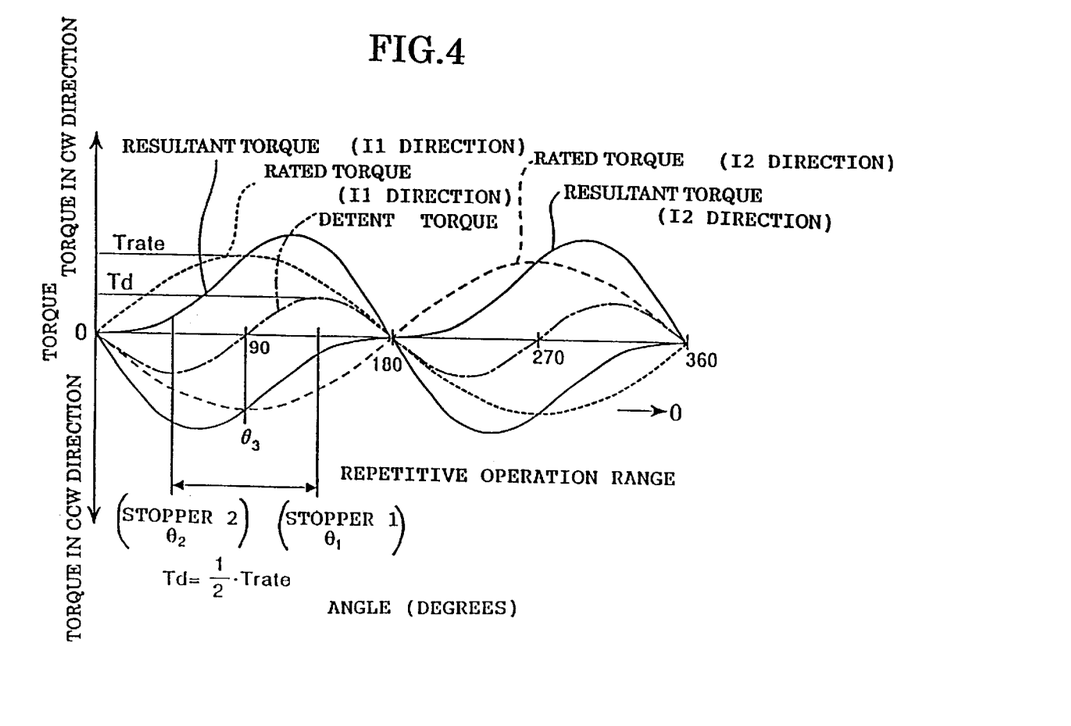
FIG. 4 shows torque characteristics of a single-phase, claw pole-structure actuator of the present invention.

FIGS. 2A and 2B show the operating principle of the actuator, and FIGS. 3 and FIG. 4 show the torgue characteristics thereof. FIG. 2A shows an example of a bipolar drive with a unifilar winding, and FIG. 2B shows an example of a unipolar drive with a bifilar winding. Since the operating principle is the same for both example, explanation will be given by reference to FIG. 2A.

FIG. 2A shows a coil 28 representing the stator portion, and a rotor magnet 30 representing the rotor magnet 30 represents the synthesized location of magnets 30a, 30b, which are shifted in the circumferential direction.

There are two modes for the coil 28, in one of which current $I_1$ flows from terminal A, and in another of which current $I_2$ flows from terminal B. First, if the coil 28 is energized by current $I_1$, then terminal B. which is near the rotor magnet 10, is magnetized into N pole. Consequently, S pole of the rotor magnet 30 is attracted to the coil terminal B, with the result that torque acts in the clockwise (CW) direction, and S pole of the rotor magnet 30 stops in a state facing the coil terminal B in which state the rotor magnet 30 has rotated 90 degrees in the CW direction from the state shown in of FIG. 2A.

Conversely, if the coil 28 is energized by current $I_2$, then terminal B, which is near the rotor magnet 30, is magnetized into S pole. Consequently, N pole of the rotor magnet 30 is attracted to the coil terminal 30, with the result that torque acts in the counterclockwise (CCW) direction, and the N pole of the rotor magnet stops in a state facing the coil terminal B in which state the rotor magnet 30 has rotated 90 degrees in the CCW direction from the state shown in FIG. 2A. In this manner, if there is nothing to regulate the rotation of the rotor magnet 30, the actuator 10, in theory, will perform repetitive rotation operations of 180 degrees (±90 degrees) with excitation.

However, detent torque exists at de-energization due to the claw pole structure. Therefore, if frictional torque is ignored, resultant torque will be vector sum of the detent torque and energizing torque (In the present invention, the torque generated by energization a rated current is called "rated torques," and the maximum value thereof is referred to as Trate). FIGS. 3 and 4 indicate the relationship between these torques. FIG. 3 and FIG. 4 show typical torque characteristics of the first embodiment in which the detent torque is one half of rated torque that is, Td=Trate/2, assuming that both torques are substantially sinusoidal, and the maximum value of the detent torque is Td and the maximum value of the rated torque is Trate).

In FIGS. 3 and 4 show the torque value (expressed as "Torque" with respect to the relative angular difference θ between the rotor and stator expressed as "Angle". By way of explanation, positive torque is expressed as CW direction, and negative torque is expressed as CCW direction. These direction correspond to the directions of the rotor rotation shown in FIG. 2A. In FIG. 3, a solid line represents a resultant torque curve with the current $I_1$ flowing as shown in FIGS. 2A and 2B, a dotted line represents a rated torque curve with the current $I_1$ flowing the same direction and a chain line represents a detent torque curve. In FIG. 4 torques for the current direction $I_2$ are added to those shown in FIG. 3. From FIG. 3, it is evident that when the angle θ is 0–180 degrees (180–360 degrees), resultant torque caused by current $I_1$, becomes positive (negative), torque is generated in the CW (CCW) direction the rotor magnet 30 rotates in the CW (CCW) direction, and stops at the location of θ=180 (θ=180 ) degrees where torque constitutes 0. From FIG. 4 it is evident that, resultant torque caused by current $I_2$, becomes negative (positive) for the angle θ is 0–180 degrees (180–360 degrees), torque is generated in the direction of the CCW (CW) and the rotor magnet 30 rotates in the CCW (CW) direction, and stops at the location of θ=0(θ=360 degrees=0 degrees) degrees of torque 0. This coincides with the explanation of FIGS. 2A and 2B.

Next, the relationship between the detent torque, the repetitive rotation range, and stoppers, which is an important characteristic of the present invention, will be explained.

The relationship between detent torque, the repetitive rotation range, and stoppers will be explained by reference to FIG. 4 once again. If it is assumed that a stopper 1 and a stopper 2 are located at $θ_1$ and $θ_2$, and that the rotor is set to be repetitively operable only within the range of these $θ_1$ and $θ_2$, then the actuator will operate in the following manner.

The rotor stops and is held at location $θ_1$ ($θ_2$) of stopper 1 (2) by a torque in CW (CCW) digestion because the detent torque becomes positive (negative) if the rotor exists between $θ_3$–$θ_1$ ($θ_2$–$θ_3$) under no energization of the coil. In this state, if current $I_2$ ($I_1$) continues to flow, the rotor overcomes the positive detent torque to generate a torque in CCW (CW) direction and stops at the location $θ_2$ ($θ_1$) of stopper 2 (stopper 1). If the energizing period for the current $I_2$ ($I_1$) is short, and current is shut off before the rotor reaches $θ_3$, the rotor will return to the initial location $θ_1$ ($θ_2$) due to the positive (negative) detent torque.

If current $I_2$ ($I_1$) continues to flow for a suitably long time, and energization is shut off after the rotor stops at $θ_2$ ($θ_1$) of stopper 2 (stopper 1), then the rotor is kept to be held in the location by negative detent torque. In this state, if a current is switched into the current $I_1$ ($I_2$), the rotor overcomes negative detent torque, and generates a torque in CW (CCW) direction torque, and returns and stops at the location of $θ_1$ ($θ_2$) of stopper 1 (stopper 2).

In this manner, the present invention is characterized in that the rotor operates repetitive by within the range of $θ_1$ and $θ_2$ whenever time coil energization is switched, and at the same time, makes use of a detent torque, thereby enabling the rotor to be acted in a certain fixed direction even when the coil is not energization. Naturally, if coil energization time is continuously varied as described above, rotor operation time will continuously differ in accordance thereto.

Applying this feature to the drive of a shutter or the like of a camera, for example, the shutter will normally be closed by the detent torque, and will be opened by energizing the coil for only the time needed to take a photograph or make an exposure, and thereafter, the shutter will be closed by reverse-energization. Thereafter, if the shutter is continuously held in a closed state by detente torque with energization shut off, it would be extremely advantageous from the standpoint of power saving. Naturally, it is advantageous that film exposure time can be arbitrarily adjusted by a shutter open-close time that corresponds to energization and reverse-energization time of the actuator is also an advantage.

It is required that the actuator must have such size that it can be incorporated into the lens barrel portion of a camera, and the external dimensions thereof must be small. In the first embodiment, the actuator is small size such as 6 mm in diameter and 5.1 mm in length, and the rotor magnet thereof are as small as just 2.5 mm in diameter, and 3.4 mm in length (for two magnets). To precisely stack a plurality of small magnets such as this in the axial direction, a spacer, which will be described hereinbelow, positioning protrusions and depressions, and also adhesive recess are effectively used.

Figure 6:
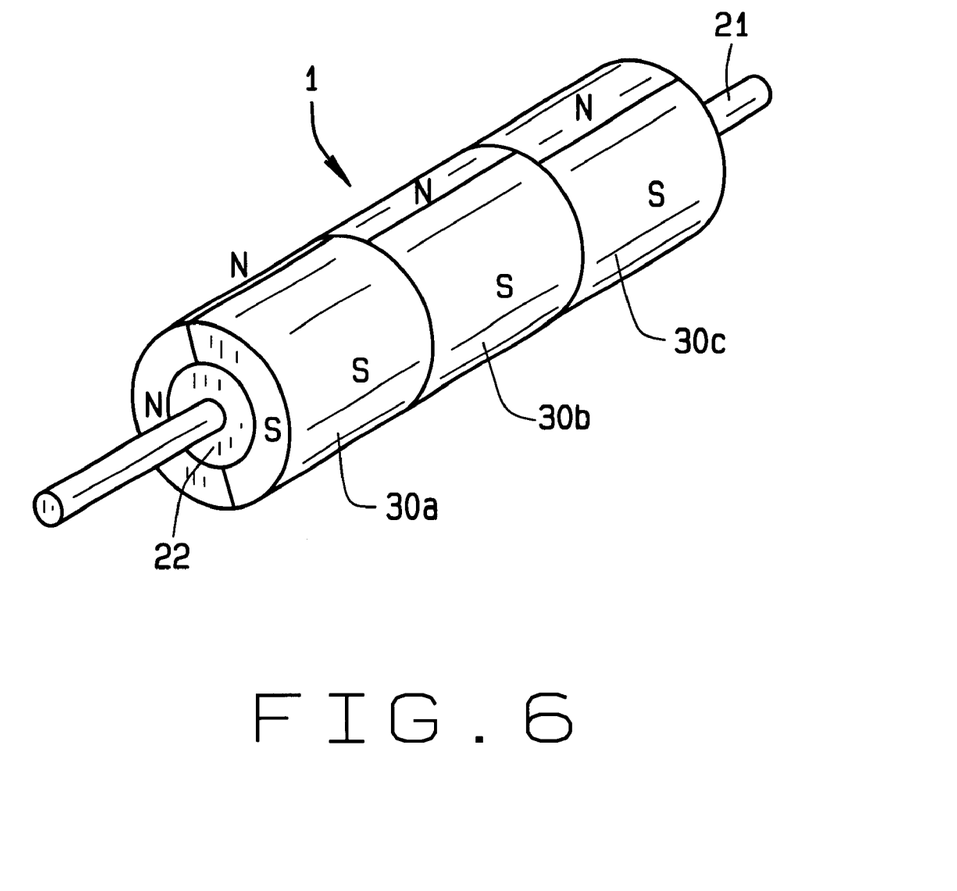
FIG. 6 shows a second embodiment of a cylindrical rotor magnet of the present invention.

Now the present invention is that it is characterized in constituted by stacking a plurality of cylindrical rotor magnets in the axial direction. FIG. 6 shows, as a second embodiment, a rotor, which makes this point clear. In this the embodiment, an example is presented, in which three magnets 30a,30b and 30c are tightly connected in the axial direction, and the respective poles thereof are shifted slightly in the circumferential direction. By so doing, it is possible to keep balance between detent torque and energizing torque in a cylindrical magnet having polar anisotropy, and as a result thereof, it is possible to furnish the same effect as FIG. 5.

Figure 7:
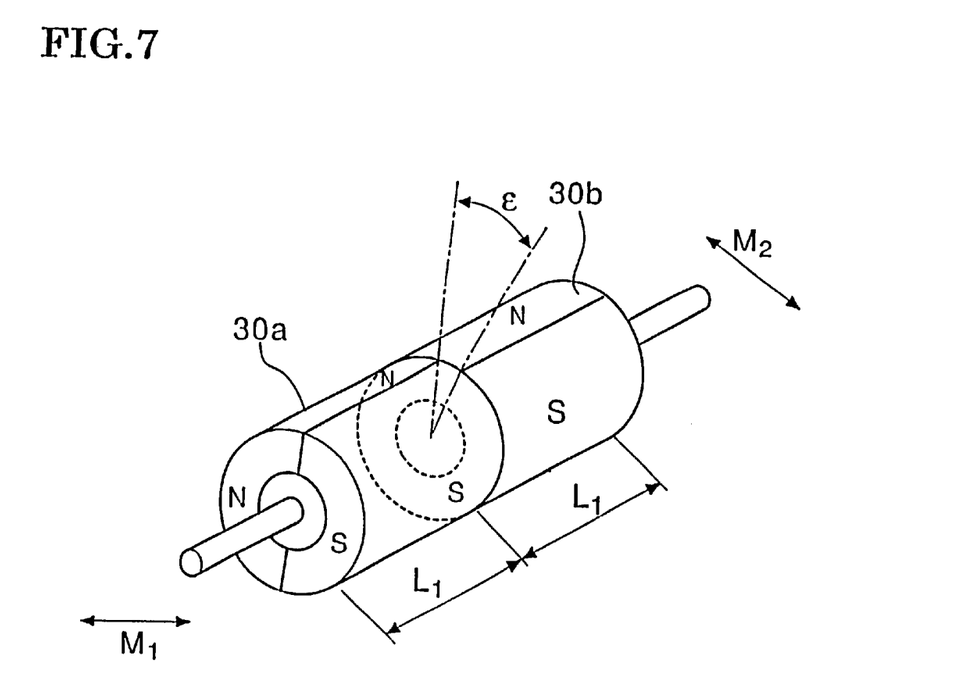
FIG. 7 shows a third embodiment of a cylindrical rotor magnet of the present invention.

FIG. 7 shows a third embodiment of the present invention. The embodiment as shown presents an example in which two cylindrical magnets of the same length and the same diameter each being two poles and having polar anisotropy, are connected in the axial direction. It is characterized that less number of magnets in used makes, the constitution of the rotor simpler than that shown in FIG. 6, in which three magnets are connected. The pole of the two cylindrical magnets 30a, 30b is circumferentially shifted by an electrical angle of ε (degrees). Since the number of rotor poles is two, the electrical angle is equivalent to the mechanical angle. In FIG. 7 arrows $M_1$, $M_2$ indicate directions of axes of easy magnetization of magnets 30a and 30b, respectively.

Figure 8:
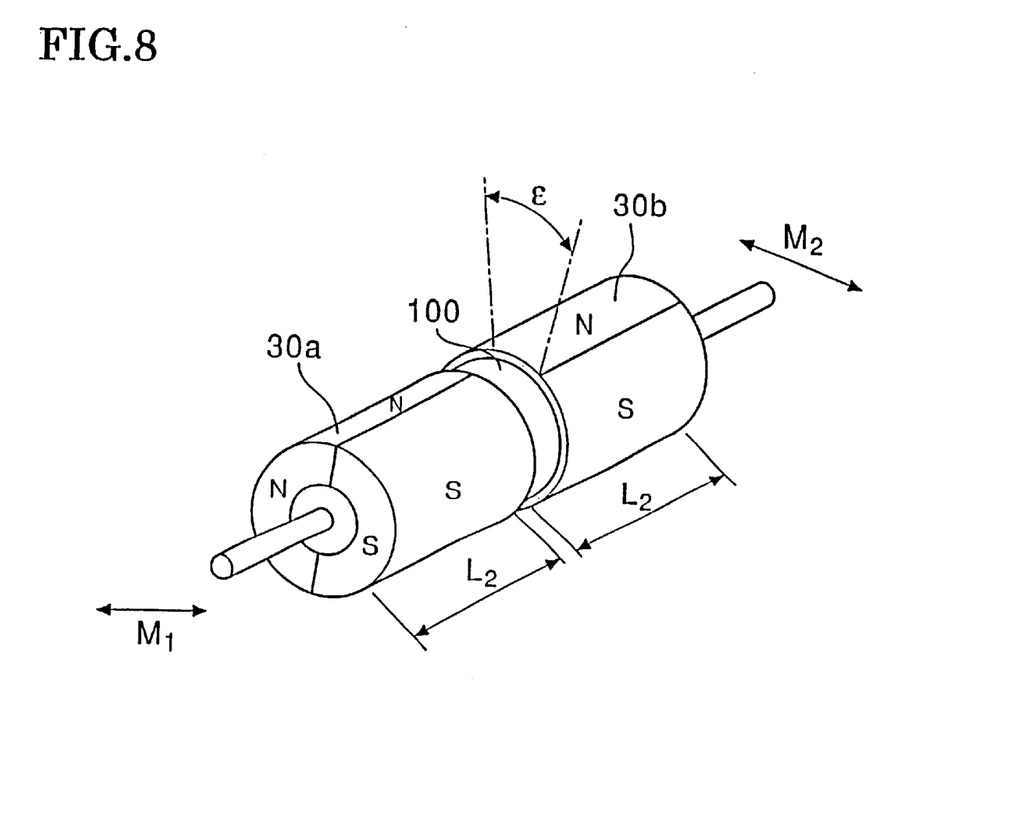
FIG. 8 shows a fourth embodiment of a cylindrical rotor magnet of the present invention.

FIG. 8 shows a fourth embodiment of the present invention. This embodiment is also of a type in which two magnets are connected in the axial direction, but differs from the embodiment of FIG. 7 in that a spacer 100 is arranged in the connecting portion of magnets 30a and 30b. It is desirable that the outer diameter of the spacer 100 is smaller than that of the magnet.

Figure 9:
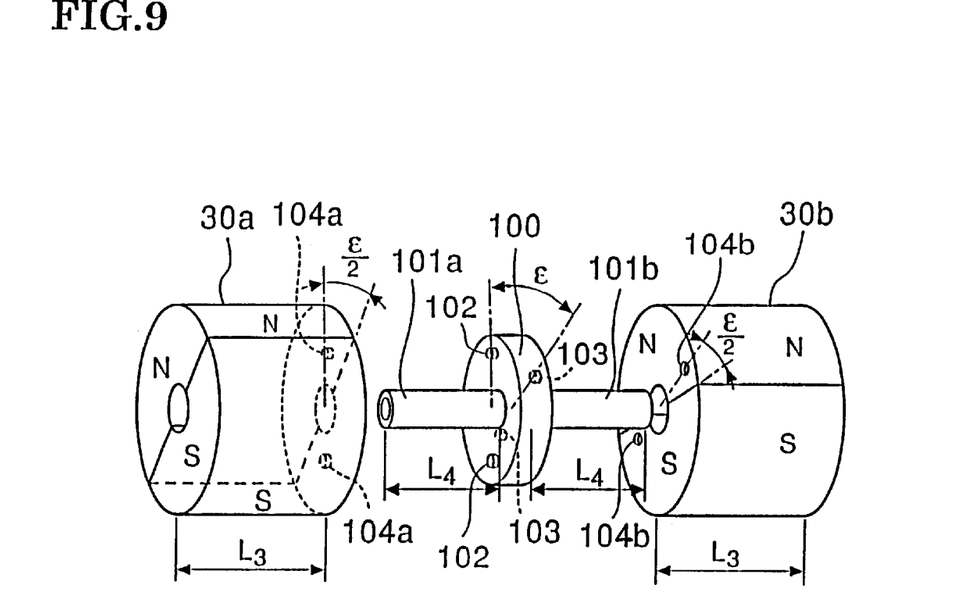
FIG. 9 shows a fifth embodiment of a cylindrical rotor magnet of the present invention.

FIG. 9 shows a fifth embodiment of the present invention, and this embodiment is similar to the fourth embodiment, in which two magnets are connected in the axial direction, but differs from the fourth aspect of the embodiment in that projections 102 and 103 for positioning magnets 30a, 30b in the circumferential direction, and sleeves 101a, 101b are integrally formed on the spacer 100. The magnets 30a and 30b are provided with holes 104a and 104b, which correspond to the above-mentioned projections 102, 103, and by the combining thereof, the magnets 30a, 30b are set to shift in a circumferential direction and to constitute an electrical angle of $\epsilon$ (degrees). In other words, the angle formed by the neutral location of the magnets 30a and 30b, and the positioning hole 104a or 104b can be set to constitute $\epsilon$/H (degrees) when converted to a mechanical angle. Here, H indicates the number of poles of magnet 30. Therefore, in the embodiment in which the number of poles H is 2, the angle will be $\epsilon$/2 (degrees). Further, it is desirable for length L4 of the sleeves 101a, 101b to be shorter than length L3 of the magnets 30a, 30b. The reason for this is that, if L3>L4, the adhesive which is forced out accumulates in the center holes of the rotor magnets 30a, 30b, and can serve as adhesive recess. Naturally, it is desirable that the bonding operation is performed after the shaft 21 (not shown in FIG. 9) has been passed through. Otherwise, the hole of the magnet will be clogged with the forced out adhesives, causing a malfunction.

Figure 10A:
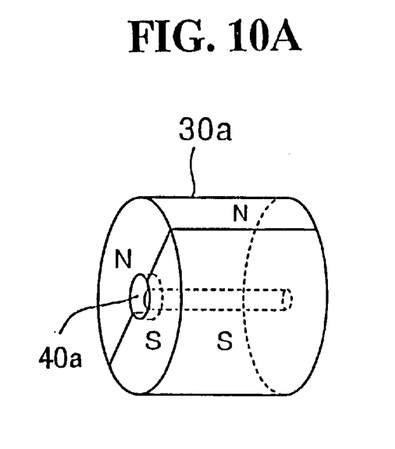
FIGS. 10A and 10B show a sixth embodiment of a cylindrical rotor magnet of the present invention.
Figure 10B:
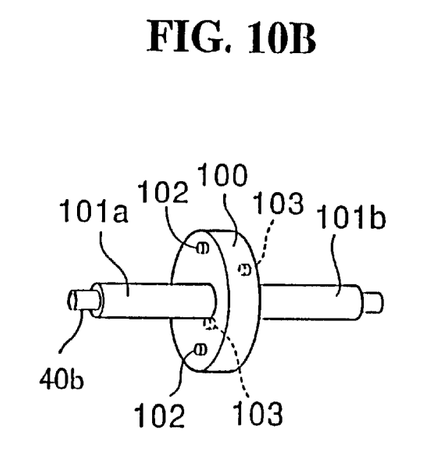

FIGS. 10A and 10B show a sixth embodiment of the present invention. FIG. 10A shows a magnet having, an adhesive recess 40a on the end face of magnet 30a (in the drawing, the left end face), and FIG. 10B also shows a sleeve having an adhesive recess 40b on the top of the sleeve (in the drawing, the left end). By means of the adhesive recess, after positioning the magnet 30a in the circumferential direction (positioning is performed by the projections 102, 103 of the spacer 100), sufficient strength of adhesive bonding can be achieved by filling the end face of the rotor magnet with adhesives, and at the same time, adhesive overflow can also be eliminated. As for the shape of the adhesive recess thereof, even a rather large fillet (C0.5–C1.5) can be substituted for the cylindrical shape shown in the drawings. Further, a groove as an adhesive recess can also be provided in the vicinity of the center hole of the magnet.

Figure 11:
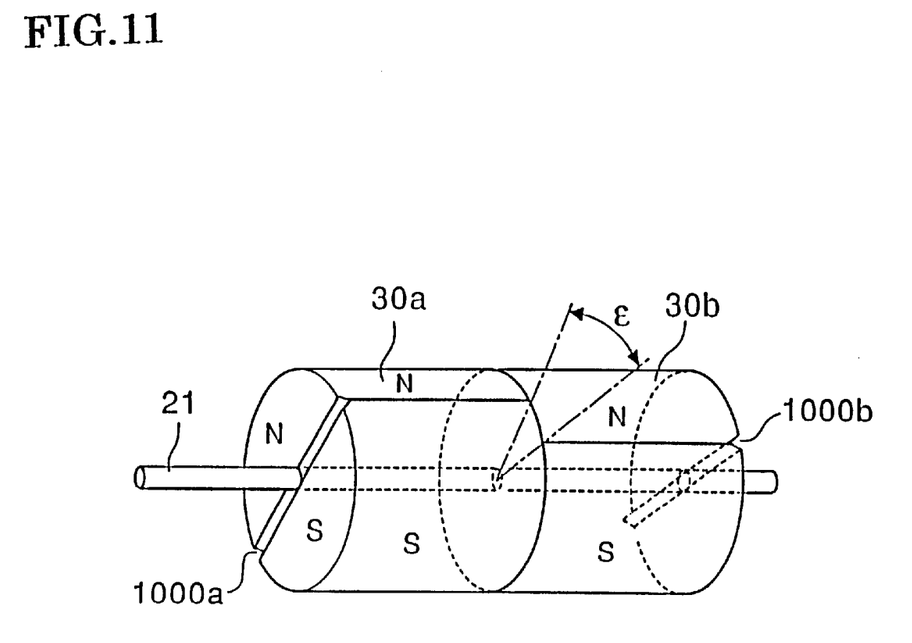
FIG. 11 shows an embodiment wherein circumferential postioning of a rotor magnet without using a spacer is realized.

FIG. 11 shows another embodiment of the present invention, which enables positioning of a magnet in circumferential direction without a spacer.

A positioning groove is provided on the end face of each magnet 30a, 30b, and FIG. 11 shows a rotor magnet with a V-shaped groove formed on the top of the neutral location on one end face of the rotor magnet. While making concentric of the two magnets with a bonding jig (not shown), the absolute position of the rotor magnet 30a in the circumferential direction is determined by picking out the V-shaped groove 1000a from one end face of the jig, and absolute positioning of the rotor magnet 30b in the circumferential direction is performed by picking out another V-shaped groove 1000b from the other end face. When the rotor magnet is set onto a magnetizing jig, these magnets 30a, 30b are set so that the angle formed thereby constitutes an electrical angle of $\epsilon$ (degrees). Then adhesives are injected into both V-shaped grooves, and the magnets 30a, 30b and the shaft 21 are bonded and affixed to each other. The V grooves 1000a and 1000b function also as adhesive recess. Formation of the V-shaped grooves on the magnets 30a, 30b enables a rotor magnet to be constituted with precision and certainty without using a spacer.

Figure 12:
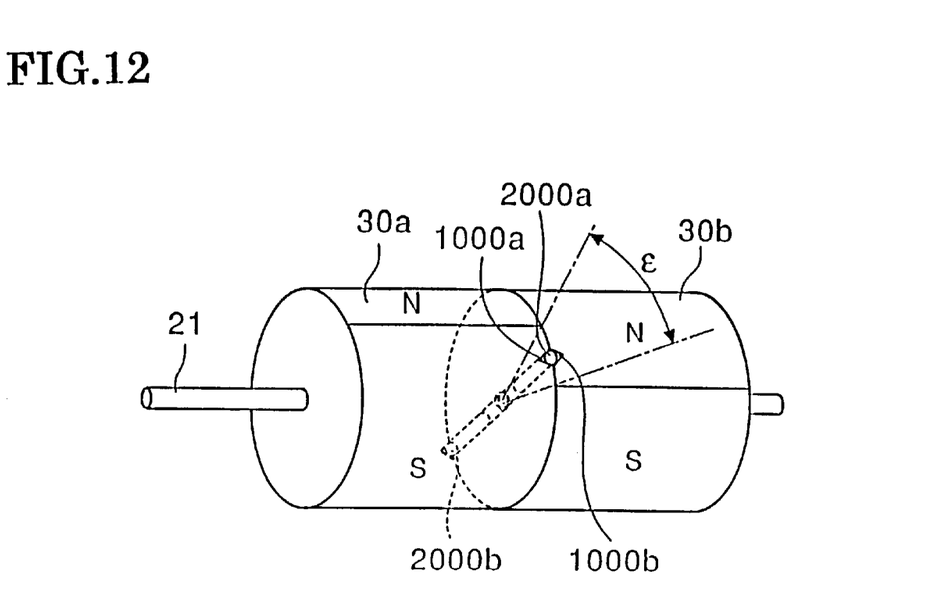
FIG. 12 is a modification of the embodiment shown in FIG. 11.

FIG. 12 shows yet another embodiment of the present invention, which is a modification of the embodiment shown in FIG. 11.

In the embodiment of FIG. 11, the V-shaped grooves 1000a, 1000b are formed on opposite faces of the rotor, and on the neutral axes of the magnets. However, in the embodiment of FIG. 12, the V-shaped grooves of the two magnets 30a, 30b are provided on identical faces which are opposite to one another, and the V-shaped grooves are shifted an electrical angle of $\epsilon$/2 (degrees) from the neutral axes, and when these V-shaped grooves are aligned along the same axis as shown in FIG. 12, the shift of the rotor magnet in the circumferential direction is set to be an electrical angle of $\epsilon$ (degrees). It is to be understood that these pins 2000a, 2000b are intended for positioning, which are inserted in the fitting surface of the V-shaped grooves, but can be affixed with adhesives while the grooves are inserted. Otherwise the pins can be removed after positioning, and then can be affixed by placing adhesives in these grooves. FIG. 12 shows an example wherein the magnets are bonded and affixed together with the pins.

Figure 13A:
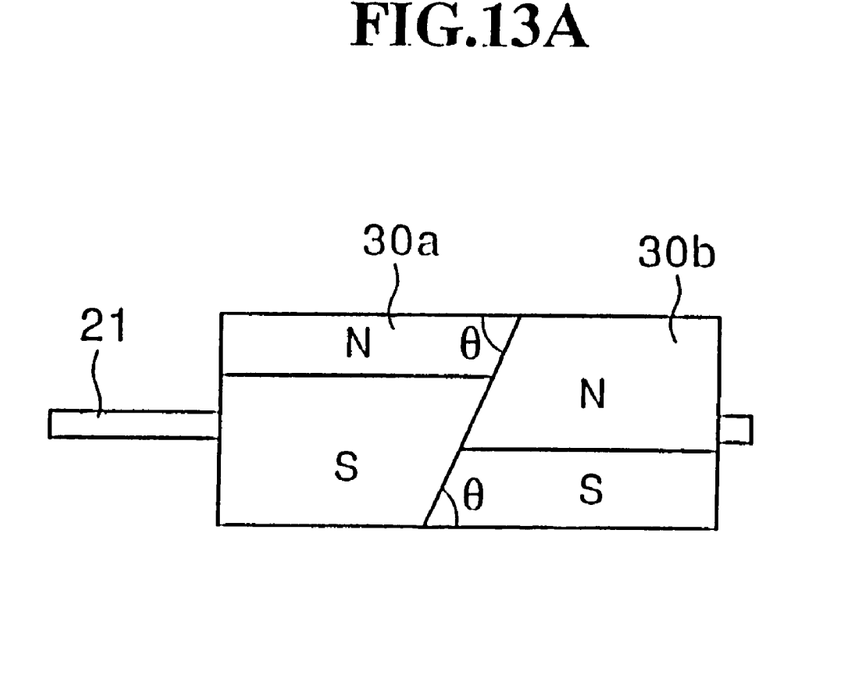
FIGS 13A and 13B show yet another embodiment of the present invention.
Figure 13B:
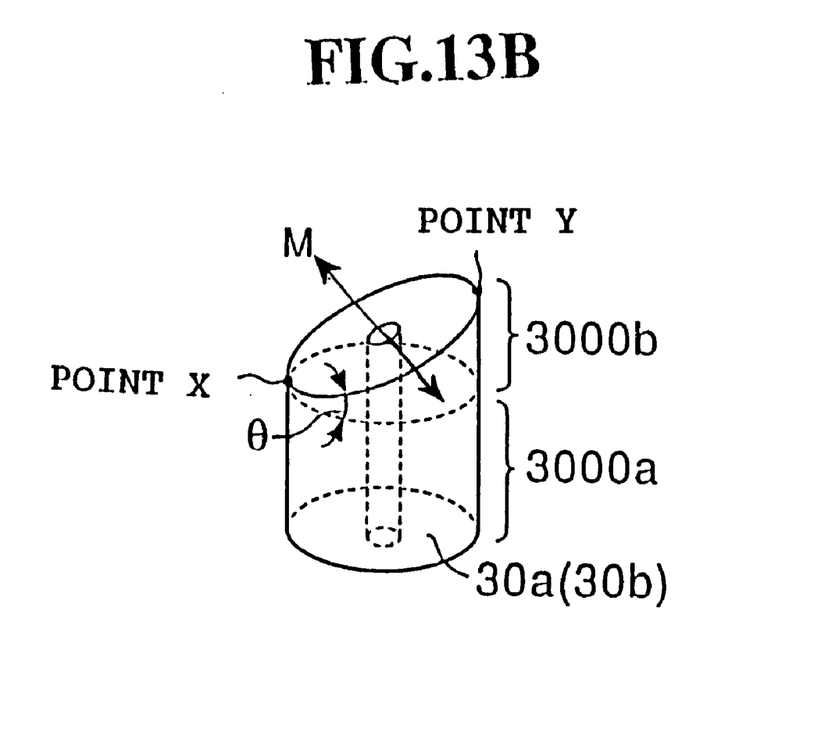

FIGS. 13A and 13B show yet another embodiment of the present invention.

FIG. 13A shows a rotor magnet in a completed form, and FIG. 13B shows a single magnet, which constitutes a rotor magnet. In this embodiment, two magnets of the same shape are bonded together on the junction portions inclining at an angle $\theta$. When these magnets are matched and assembled, the amount of shift in the circumferential direction of two axes of easy magnetization is set to $\epsilon$. In an example as shown in FIG. 13B, a single magnet is a combined cylindrical portion 3000a and inclined portion 3000b. In other words, the angle formed by a line connecting a point X (lowest portion) to point Y (highest portion) on the inclined portion 3000b, and the direction M of orientation of the magnet can be set to $\epsilon$/2. Doing so makes it possible to stably achieve a shift of the two rotor magnets in the circumferential direction without providing the rotor magnet with a special groove or notch.

Next magnetization of the rotor 1 will be mentioned. After magnetization the respective rotor magnets, these magnets can be affixed with adhesives or the like, for example as shown in FIGS. 9, 10A, 10B, 11 and 12. However when bonding is performed after magnetization, these will be a drawback that the bonding operation is difficult to perform because respective rotor magnets repel one another due to pole of the magnets' end faces. In such a case, the magnets can be affixed prior to magnetization, using the method described by reference to FIGS. 9 through 12 and magnetization can be performed in the state thereof. In the case of polar anisotropic magnets in particular, it is desirable to set a magnet in a magnetization jig in the direction of the axis of average easy magnetization which is achieved by aligning the magnetic field in the direction of an electrical angle of $\epsilon$/2 at magnetization, and to simultaneously magnetization. In this case, as there is a tendency for the amount of shift in the circumferential direction after magnetization to be less than the desired $\epsilon$ angle, it is desirable to set the amount of shift in the circumferential direction of prior magnetization slightly larger than the desired amount e of shift (20–30% by an electrical angle).

Finally, the amount of shift of the respective magnets in the circumferential direction when connecting the magnets in the axial direction will be explained.

As a result of performing various tests or the amount of shift of magnets in the circumferential direction at electrical angles of $\epsilon$ (degrees) with the number of poles H being two, it was learned that 10–60 (degrees) is the proper amount $\epsilon$ as the magnet shift. When the shift amount $\epsilon$ is too small (less than 10 degrees), there is no shift effect due to the frat that detent torque is not sufficiently degraded. To the contrary, when the shift amount $\epsilon$ is too large (more than 60 degrees), there will be a drawback that the amount of cancellation of N, S pole magnetic flux at the matching end portions of the magnets becomes too great, and at the same time, because the magnet behaves like a magnet having a number of poles of 2H (for H=2, 4 poles), and does not perform the operation described in connection with FIG. 2.

Further, in cases where the number of connected magnets exceeds 2 as well, it is desirable that the magnets be shifted within a range in which the maximum amount of shift ε (degrees) between the respective magnets does not exceed an electrical angle of between 10 and 60 (degrees).

In the above embodiments, the present invention has been explained by way of example wherein the number of poles H of a magnet is two, but in the present invention, the number of rotor poles H is not limited to two. Furthermore, it is known that the relationship between electrical angle θe (degrees) and mechanical angle θm (degrees) when the number of poles is H (poles) is θm=2θe/H (degrees).

According to the present invention, it is possible to constitute an actuator in an armature structure having an inexpensive single-phase structure that keeps a balance between detent torque and energizing torque, and has a wide rotation range, by using a plurality of inexpensive-to-process cylindrical magnets connected in the axial direction.

Further, providing a spacer when connecting a plurality of magnets in the axial direction, and adding rotor recess banks thereto hag such effect that enables a rotor to be assembled with precision and certainty. When the number of connected magnets is two in particular, providing a groove on an end face of a rotor magnet, and using the groove to perform circumferential positioning enables a rotor to be assembled precisely and simply without using a spacer.

What is claimed is:

1. A single phase actuator comprising:
   an armature having an energizable coil winding around an axial gap;
   a stopper mechanism comprising a first stopper located at a first angular position that is between 0 and 90 degrees in terms of electrical angle from a zero torque position and a second stopper located at a second angular position that is between 90 and 180 degrees in terms of electrical angle from said zero torque position; and
   a rotor rotatably disposed within said axial gap for rotation between said first angular position and said second angular position, said rotor comprising a plurality of magnets connected axially, each of said rotor magnets having magnetic poles, the magnetic poles of each rotor magnet being mutually shifted in a circumferential direction such that the magnetic poles of each rotor magnet are not in axial alignment with the magnetic poles of the each other rotor magnet; and
   wherein, in response to energization of said coil in a first direction, said rotor rotates to said first angular position of said first stopper;
   wherein, in response to energization of said coil in a second direction, said rotor rotates to said second angular position of said second stopper; and
   wherein, upon deenergization of said coil when said rotor is located at either said first angular position or said second angular position, said rotor maintains its angular position in response to a detent torque.

2. The actuator according to claim 1 wherein said armature further comprises a first stator yoke made of a soft magnetic material and having a flat portion from which a first pole tooth protrudes in an axial direction, a second stator yoke made of a soft magnetic material and having a flat portion from which a second pole tooth protrudes in an axial direction, a cylindrical ring disposed between said first and second stator yokes, and a resin bobbin disposed within said cylindrical ring, said resin bobbin having an annular concave portion within which said coil winding is disposed, wherein said actuator further comprises an upper flange and a lower flange between which said armature is disposed, and wherein a minute gap exists between said rotor and said pole teeth.

3. The actuator according to claim 2 wherein said rotor magnets all have the same outside diameter, and wherein said outside diameter is equal to or less than 3 mm.

4. The actuator according to claim 2 wherein each rotor magnet has the same axial length.

5. The actuator according to claim 2 wherein said rotor comprises two rotor magnets, each rotor magnet having magnetic anisotropy.

6. The actuator according to claim 5 wherein aid circumferential shift between the magnetic poles of said two rotor magnets ranges between 10 and 60 degrees in terms of electrical angle.

7. The actuator according to claim 5 wherein a groove or hole for positioning said rotor magnets in an appropriate circumferential direction is provided on the end of each of said rotor magnets.

8. The actuator according to claim 5 wherein both of said rotor magnets have a cylinder portion and an inclined portion, wherein said inclined portions of said two rotor magnets correspond to each other so the two rotor magnet form a full cylinder when joined.

9. The actuator according to claim 2 wherein said rotor further comprises a spacer disposed between said two rotor magnets, said spacer having an outer diameter equal to or legs than the diameters of said rotor magnets.

10. The actuator according to claim 9 wherein each spacer has at least one projection provided on each of its ends, and wherein each rotor magnet has provided on one of its ends a number of sleeves corresponding to the number of spacer projections provided on the end of the spacer to which that rotor magnet is mated, said sleeves for mating with said spacer projections to position said rotor magnets in an appropriate circumferential direction.

11. The actuator according to claim 1 wherein said rotor further comprises a spacer disposed between each of said rotor magnets for bonding said rotor magnets thereto in an axial direction, said bond occurring by way of an adhesive recess provided either in the vicinity of a center hole of said rotor magnets, on each spacer, or on both thereof.

12. The actuator according to claim 1 wherein, upon deenergization of said coil when said rotor is located at an angular position in between said first angular position and said second angular position, said rotor rotates, in response to a detent torque, to either said first angular position or said second angular position depending upon the direction of said detent torque at said in-between angular position.

* * * * *